March 16, 1954 — J. A. VANOUS — 2,672,588
PHASEMETER
Filed May 20, 1950

INVENTOR.
Joseph A. Vanous
BY Marvin Moody
ATTY.

Patented Mar. 16, 1954

2,672,588

UNITED STATES PATENT OFFICE 2,672,588

PHASEMETER

Joseph A. Vanous, Cedar Rapids, Iowa, assignor to Collins Radio Company, Cedar Rapids, Iowa, a corporation of Iowa Application May 20, 1950, Serial No. 163,111

2 Claims. (Cl. 324—89)

1

This invention relates to means for measuring the phase relationship of signals.

It often becomes desirable to measure the phase relationship between two signals of the same frequency. A phase comparison is required, for example, in some types of radio compasses.

It is an object of this invention, therefore, to provide means for measuring the phase relationship between two signals economically and quickly.

Another object of this invention is to provide phase indicating apparatus which is simple to operate.

Still another object of this invention is to provide a pair of balanced radio tube circuits which give an output proportional to the difference in phase in the two circuits.

A feature of this invention is found in the provision for a phase comparer having a cathode follower tube and its associated circuitry, whose output is compared to the output of a second tube which may be connected as either a cathode follower or a phase inverter.

An object of this invention is to provide a phase meter which is accurate over a wide frequency range.

Further objects, features, and advantages of this invention will become apparent from the following description and claims when read in view of the drawings, in which:

Figure 2 illustrates an audio oscillator 10 which may give an output over a wide frequency range as, for example, 300 to 100,000 cycles per second.

An amplitude output adjustment 11 controls the amplitude of the output of the oscillator and may be adjusted to any desired output. The audio oscillator is used for explanatory purposes only, and it is to be understood that any input may be substituted therefor.

A phase shift network 12 receives an output from the audio oscillator 10 and shifts its phase by an angle $\theta$. The network 12 has been illustrated as comprising a condenser $C_1$ and a resistance $R_1$, but it is to be understood that any phase shift network may be substituted therefor.

The output of the phase shift network 12 and an output directly from the audio output oscil-

Figure 2:
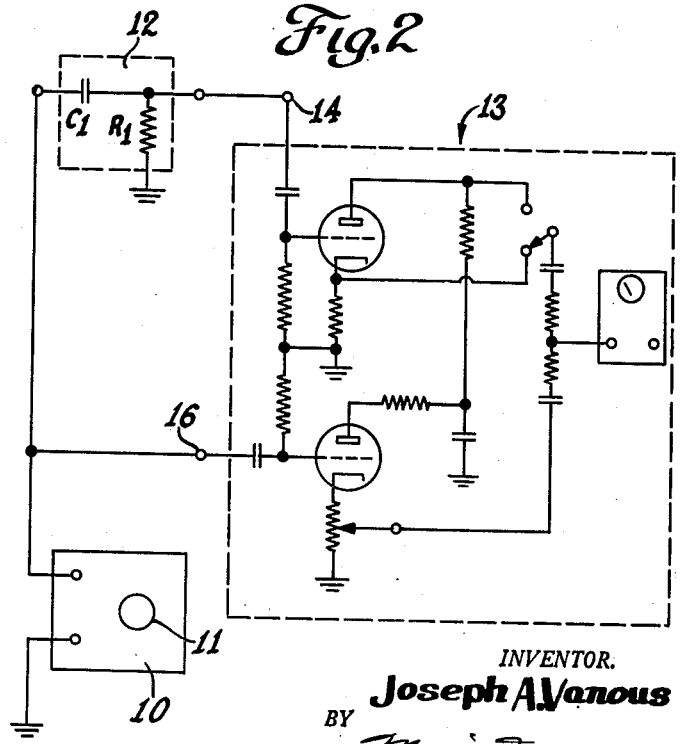
Figure 2 is a schematic illustration of the invention showing the input and phase shift circuits; and, Figure 3 is an equivalent circuit of the apparatus shown in Figure 1.

2 lator 10 are furnished to the phase meter of this invention, illustrated generally in Figure 2 as 13.

Figure 1:
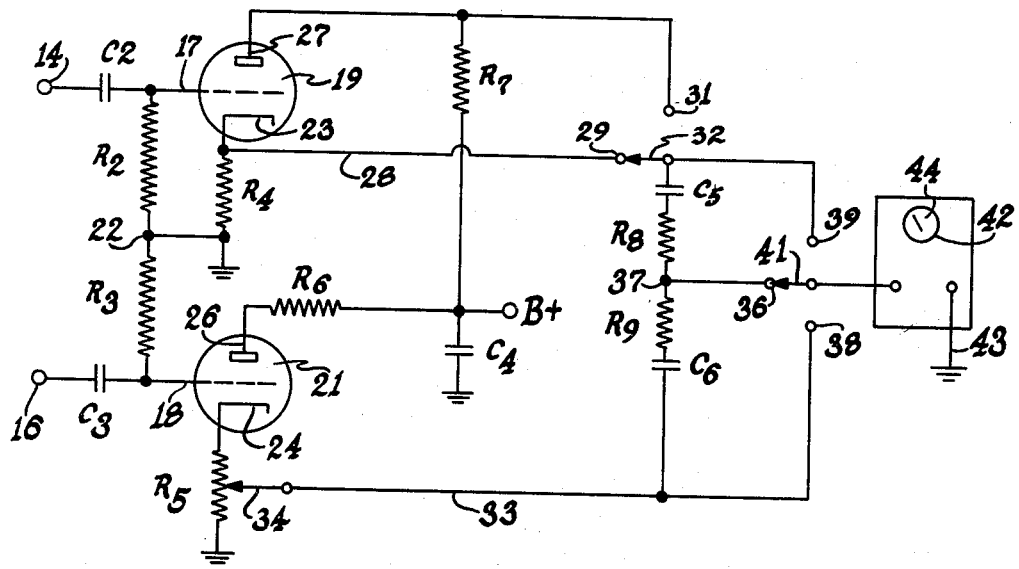
Figure 1 is a schematic illustration of the phase meter of this invention.

The phase meter 13 is illustrated in more detail in Figure 1. A terminal 14 receives the input from phase shift network 12 and the terminal 16 receives an input from the audio oscillator 10. A pair of resistors $R_2$ and $R_3$ are connected in series between grids 17 and 18 of a pair of vacuum tubes 19 and 21, respectively. Blocking condensers $C_2$ and $C_3$ are connected between the grids 17 and 18 and the terminals 14 and 16. Connection point 22 between $R_2$ and $R_3$ is grounded. A cathode resistor $R_4$ is connected between ground and the cathode 23 of tube 19. A resistor $R_5$ is connected between ground and cathode 24 of the tube 21. The plate 26 of the tube 21 is connected to B+ through the plate resistor $R_6$. Likewise, plate 27 of tube 19 is connected to B+ through the resistor $R_7$. A condenser $C_4$ is connected between B+ and ground. A lead 28 is connected to the cathode 23 of tube 19 and terminates in a contact 29. A second contact 31 is connected to the plate 27 of the tube 19. A switch 32 is movable between contacts 29 and 31. A condenser $C_5$, resistors $R_8$ and $R_9$, and condensers $C_6$ are connected in series between a switch 32 and a lead 33. The lead 33 terminates in a slide contact 34 which is movable along the resistor $R_5$. A contact 36 is electrically connected to the point 37 between the resistors $R_8$ and $R_9$ and contact 38 is connected to the lead 33. Another contact 39 is connected to the switch 32. A second switch 41 is movable to engage any one of the three contacts 36, 38, and 39.

An alternating current voltmeter 42 which may be, for example, of the type described at page 377 of "Principles of Radio Engineering" by Glasgow, has its input lead connected to the switch 41 and is connected to ground through the lead 43. The meter 42 has a dial 44 which indicates the alternating current voltage impressed across the terminals of the meter.

When the switch 41 engages contact 36 and the switch 32 engages the contact 29, the alternating voltages between the switch 41 and ground will be equal to the cosine of one-half the phase angle, $\theta$, between the inputs supplied to contacts 14 and 16, providing that the voltages at contact 39 and 38 are equal to one volt. If, on the other hand, the switch 32 is in engagement with the contact 31 and the switch 41 is in engagement with the contact 36, the voltage will be equal to the sine of one-half the phase angle, $\theta$.

The circuit components may have, for example, the following values:

| | |
|---|---|
| $R_2$ | 1 megohm. |
| $R_3$ | 1 megohm. |
| $R_4$ | 560 ohms. |
| $R_5$ | 560 ohms. |
| $R_6$ | 560 ohms. |
| $R_7$ | 560 ohms. |
| $R_8$ | 10,000 ohms. |
| $R_9$ | 10,000 ohms. |
| $C_2$ | 0.01 microfarad. |
| $C_3$ | 0.01 microfarad. |
| $C_4$ | 30 microfarads. |
| $C_5$ | 0.01 microfarad. |
| $C_6$ | 0.01 microfarad. |

The dial 44 may be calibrated to indicate the sine and cosine, respectively, of one-half the phase angle, or may be calibrated in phase angle by having two scales to correspond to the sine and cosine positions of switch 32. When the meter reads cosine and sine of one-half the phase angle, a trigonometric table may be used to find $$\frac{\theta}{2}$$

and thus, $\theta$.

Figure 3:
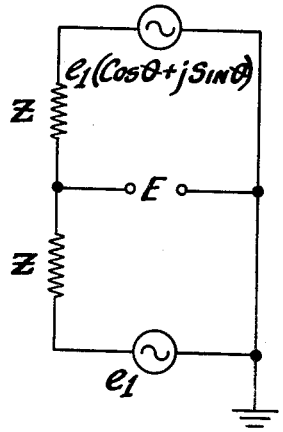

The voltages between terminal 29 and ground and between terminal 38 and ground must be equal and for simplicity, a value of one volt is desirable. This is accomplished by moving switch 32 to engage contact 29 and switch 41 to engage contact 39. The output of audio oscillator 10 is then adjusted until meter 42 gives a reading of one volt. Switch 41 may be moved to engage contact 38 and contact 34 adjusted until a reading of one volt is obtained on meter 42. Switch 41 is then moved to engage contact 36. Figure 3 illustrates the equivalent circuit with switch 32 connected to contact 29.

Because the input circuits to tubes 19 and 21 have the same value components, the outputs across $R_4$ and $R_5$ will be equal in magnitude and have a phase relationship of $\theta$, caused by the phase shift network 12.

If the voltage between switch 34 and ground is designated as $e_1$, the voltage across resistor $R_4$ will be $e_1 (\cos \theta + j \sin \theta)$. This is shown in the equivalent circuit of Figure 3. Because $C_5$ is chosen to equal $C_6$ and $R_8$ is chosen to equal $R_9$, their combined impedance may be designated as Z.

The voltage E is the voltage between contact 36 and ground and is read by meter 42.

From the equivalent circuit, according to Kirkoff's law, the following equation may be written:

(1) $\qquad e_1 - e_1 (\cos \theta + j \sin \theta) = i (2Z)$ where $i$ is equal to the current flowing in the equivalent circuit.

Solving for $i$ from Equation 1:

(2) $\qquad i = \frac{e_1}{2Z} - e_1 \frac{(\cos \theta + j \sin \theta)}{2Z}$

Another equation may be written:

(3) $\qquad E = e_1 - iZ$

It is assumed that the resistance of the voltmeter 42 is great enough so that it draws negligible current.

By substituting in Equation 3, the value of $i$ obtained in Equation 2, the following equation is obtained:

(4) $\qquad E = \frac{e_1}{2}(1 + \cos \theta + j \sin \theta)$

Solving for the absolute value of E:

(5) $\qquad (E) = ((1 + \cos \theta)^2 + \sin^2 \theta)^{\frac{1}{2}}$ (6) $\qquad (E) = \frac{e_1}{2}(2 + 2 \cos \theta)^{\frac{1}{2}}$ (7) $\qquad (E) = \frac{e_1}{2}\left[ 2\left(\frac{1 + \cos \theta}{2}\right)^{\frac{1}{2}} \right]$ (8) $\qquad (E) = e_1 \cos \frac{\theta}{2}$ Thus, if $e_1$ is adjusted to one volt, the meter 42 will read $$\cos \frac{\theta}{2}$$

with the switch 32 connected to contact 29.

Similarly, it can be shown that when the switch 32 is connected to the contact 31, the meter 42 will read a voltage equal to a sine of one-half the phase angle.

It is seen that this invention provides means for measuring the phase angle between two input signals. The sine function changes more rapidly between angles of zero to 45 degrees than between angles of 45 to 90 degrees, so the sine of $$\frac{\theta}{2}$$

position is used for phase shift angles that are between 0 and 90 degrees. The cosine functions change more rapidly between 45 and 90 degrees than between zero and 45, so the cosine position is used for angles that are between 90 and 180 degrees.

This invention may also be used as a power factor meter since the power factor is defined as cosine $\theta$. By using an appropriate scale cosine $\theta$ may be read directly. Thus the power factor of the phase shift network 12 may be obtained. The phase meter may also be used as a frequency meter to identify an unknown frequency. If the phase shift network 12 utilizes precision components whose values of reactance are known, the phase shift indicated by meter 42 may be translated into frequency. It is well known that phase shift varies with frequency. Thus if the phase shift network components and the phase shift are known, the frequency of the applied signal may be obtained.

Although this invention has been described with respect to particular embodiments thereof, it is not to be so limited that changes and modifications may be made therein which are within the full intended scope of this invention, as defined by the appended claims.

I claim:

1. Apparatus for measuring phase relationship between a pair of input signals comprising, a first electronic valve receiving one of said signals on its control grid, a second electronic valve receiving the other of said signals on its control grid, a first lead connected to the cathode of said first electronic valve, a second lead adjustably connected to the cathode resistor of said second electronic valve, an impedance comprising a first condenser, a first resistor, a second resistor, and a second condenser connected in series between said first and second leads, alternating current voltage indicating means connected to the point between said first and second resistors to give an indication proportional to the cosine of one-half the phase angle between said first and second signals.

2. Apparatus for measuring phase relationship between a pair of input signals comprising, a first electronic valve receiving one of said signals on its control grid, a second electronic valve receiving the other of said signals on its control grid, a first lead connected to the plate of said first electronic valve, a second lead adjustably connected to the cathode resistor of said second electronic valve, an impedance comprising a first condenser, a first resistor, a second resistor, and a second condenser connected in series between said first and second leads, alternating current voltage indicating means connected to the point between the first and second resistors to give an indication proportional to the sine of one-half the phase angle between said first and second signals.

JOSEPH A. VANOUS.

References Cited in the file of this patent

UNITED STATES PATENTS

| Number | Name | Date |
|---|---|---|
| 2,176,742 | La Pierre | Oct. 17, 1939 |
| 2,318,248 | Minton | May 4, 1943 |
| 2,366,621 | Hineline | Jan. 2, 1945 |
| 2,517,805 | Spindler | Aug. 8, 1950 |